US012747060B2

(12) United States Patent
Klok et al.

(10) Patent No.: US 12,747,060 B2
(45) Date of Patent: Sep. 29, 2026

(54) HOT FILL CONTAINER WITH WAVY GROOVE

(71) Applicant: The Coca-Cola Company, Atlanta, GA (US)

(72) Inventors: Jeffrey Klok, Atlanta, GA (US); Sterling Lane Steward, Douglasville, GA (US); Venkat Govindarajan, Duluth, GA (US); Feng Shi, Marietta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 1154 days.

(21) Appl. No.: 16/611,569

(22) PCT Filed: May 9, 2018

(86) PCT No.: PCT/US2018/031788

§ 371 (c)(1),
(2) Date: Nov. 7, 2019

(87) PCT Pub. No.: WO2018/208906

PCT Pub. Date: Nov. 15, 2018

(65) Prior Publication Data

US 2020/0095011 A1 Mar. 26, 2020

Related U.S. Application Data

(60) Provisional application No. 62/504,087, filed on May 10, 2017.

(51) Int. Cl.
*B65D 1/44* (2006.01)
*A23B 2/10* (2025.01)

(Continued)

(52) U.S. Cl.
CPC ................ *B65D 1/44* (2013.01); *A23B 2/103* (2025.01); *A23B 2/20* (2025.01); *A23B 70/30* (2025.01);

(Continued)

(58) Field of Classification Search
None
See application file for complete search history.

(56) References Cited

U.S. PATENT DOCUMENTS 6,497,333 B1 * 12/2002 Ellis .................... B65D 1/0223 215/383
8,186,529 B2 * 5/2012 Kinmont ................. B65D 1/42 220/675

(Continued)

FOREIGN PATENT DOCUMENTS

EP 2084071 A2 8/2009
EP 2813437 A1 12/2014

(Continued)

OTHER PUBLICATIONS

Extended EP Search Report, EP 18799188.0, dated Feb. 5, 2021 (7 pp.).

(Continued)

*Primary Examiner* — Tanzim Imam
(74) *Attorney, Agent, or Firm* — Eversheds Sutherland (US) LLP

(57) ABSTRACT

The present application provides a container for a beverage filled in a hot fill process. The container may include an upper section and a lower section. The lower section may include a wavy groove defining a number of tongue panels and wherein the wavy groove may include a substantial Z-like shape.

15 Claims, 3 Drawing Sheets

(51) Int. Cl.

| | |
|---|---|
| ***A23B 2/20*** | (2025.01) |
| ***A23B 70/30*** | (2025.01) |
| ***A23L 2/46*** | (2006.01) |
| ***A23L 3/015*** | (2006.01) |
| ***B65B 3/04*** | (2006.01) |
| ***B65D 1/02*** | (2006.01) |
| ***B65D 79/00*** | (2006.01) |
| ***B65D 81/20*** | (2006.01) |
| ***B65D 85/72*** | (2006.01) |
| ***B67C 3/04*** | (2006.01) |

(52) U.S. Cl.

CPC .............. *B65B 3/04* (2013.01); *B65D 1/0223* (2013.01); *B65D 79/0084* (2020.05); *B65D 81/2015* (2013.01); *B65D 85/72* (2013.01); *B67C 3/045* (2013.01); *A23V 2002/00* (2013.01)

(56) References Cited

U.S. PATENT DOCUMENTS

| | | | | |
|---|---|---|---|---|
| 8,870,006 | B2 * | 10/2014 | Kamineni ............ | B65D 1/0261 215/381 |
| 2003/0015491 | A1 * | 1/2003 | Melrose ............. | B65D 79/0084 215/381 |
| 2006/0289378 | A1 | 12/2006 | Zhang | |
| 2007/0125743 | A1 | 6/2007 | Pritchett, Jr. et al. | |
| 2008/0061024 | A1 * | 3/2008 | Keilen ............... | B65D 79/0084 215/382 |
| 2010/0000962 | A1 * | 1/2010 | Lepoitevin ............... | B65D 1/42 215/381 |
| 2010/0006580 | A1 | 1/2010 | Boukobza | |
| 2010/0155359 | A1 * | 6/2010 | Simon ................ | B65D 79/0084 220/675 |
| 2011/0049084 | A1 * | 3/2011 | Yourist ................ | B65D 1/0253 215/382 |
| 2012/0305518 | A1 | 12/2012 | Ladina et al. | |
| 2015/0008210 | A1 * | 1/2015 | Oshino ................ | B65D 1/0276 215/373 |
| 2015/0144587 | A1 * | 5/2015 | Hanan .................. | B65D 1/0223 215/382 |
| 2015/0314907 | A1 * | 11/2015 | Kira ..................... | B65D 23/102 215/383 |
| 2016/0122065 | A1 * | 5/2016 | Mooney ............. | B65D 79/0084 215/373 |
| 2016/0176605 | A1 | 6/2016 | Pritchett et al. | |
| 2016/0311570 | A1 * | 10/2016 | Didier .................. | B65D 1/0223 |
| 2016/0311599 | A1 * | 10/2016 | Stelzer ............... | B65D 79/0081 |

FOREIGN PATENT DOCUMENTS

| | | | | |
|---|---|---|---|---|
| JP | 2016159941 A | | 9/2016 | |
| WO | 2009135046 A1 | | 11/2009 | |
| WO | WO-2014062071 A1 | * | 4/2014 | ............... B65D 1/02 |

OTHER PUBLICATIONS

International Search Report and Written Opinion, PCT/US2018/031788, Aug. 28, 2018 (9 pp.).

* cited by examiner

HOT FILL CONTAINER WITH WAVY GROOVE

TECHNICAL FIELD

The present application and the resultant patent relate generally to beverage containers and more particularly relate to lightweight beverage bottles with groove and panel structures providing increased rigidity for accommodating the forces typically associated with hot fill processes in a highly aesthetic design.

BACKGROUND OF THE INVENTION

Beverages such as sport drinks, juices, teas, waters, and the like are often bottled via hot fill processes so as to prevent microbial growth. The hot fill processes generally involve pasteurizing the beverage at about 95 degrees Celsius for about 20 seconds, cooling the beverage to about 85 degrees Celsius, and then filling the bottles with the beverage. The 85 degree temperature generally is sufficient to sterilize the bottles. A closure is then applied to the bottle to create a sealed container. The bottle then may be passed through a cooling tunnel after filling and capping to be cooled via a water spray or other methods. The final temperature of the beverage after the cooling process generally may be less than about 40 degrees Celsius. Other types of hot fill processes may be known using different times, temperatures, and equipment. Different types of beverages also may necessitate different types of bottling techniques.

During the cooling process, the beverage may contract such that a vacuum forms within the enclosed container. To help offset the impact of such a vacuum, bottles used in the hot fill processes generally have special vacuum panels formed therein. These vacuum panels and the areas therebetween generally promote a controlled deformation or deflection so as to accommodate the forces created by the vacuum while maintaining the overall integrity of the bottle. These hot filled bottles generally require relatively complex shapes and may use significantly more thermoplastic material as compared to cold filled bottles and the like. As a result, hot fill bottles may be more expensive to produce in terms of both tooling and material and also may offer less design freedom.

There is thus a desire for improved hot fill containers and methods of filling the same. Such improved containers may accommodate the contraction of a beverage therein while maintaining the overall integrity of the container without the complexity, the weight, and the costs typically associated with hot fill containers and the like.

SUMMARY OF THE INVENTION

The present application and the resultant patent thus provide a container for a beverage filled in a hot fill process. The container may include an upper section and a lower section. The lower section may include a wavy groove defining a number of tongue panels and wherein the wavy groove may include a substantial Z-like shape.

The present application and the resultant patent further provide a method of bottling a hot liquid. The method may include the steps of positioning a wavy groove and a number of tongue panels along a section of the container, filling the container with the hot liquid, cooling the container, forming a vacuum within the container, and flexing the container about the wavy groove and the tongue panels.

The present application and the resultant patent further provide a 250 milliliter container. The container may include an upper section and a lower section. The lower section may include a continuous wavy groove bisecting a first tongue panel and a second tongue panel and wherein the wavy groove may include a substantial Z-like shape.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
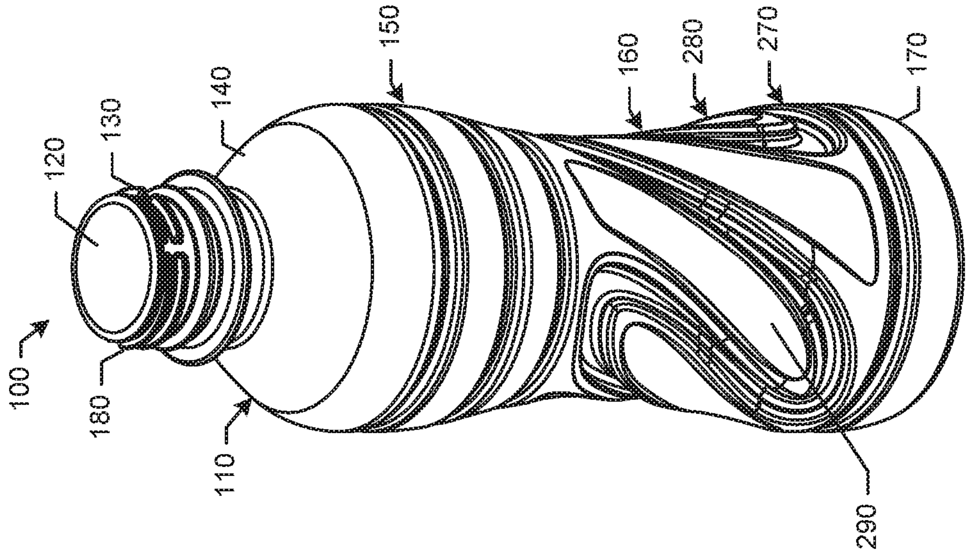
FIG. 1 is a perspective view of a hot fill container as may be described herein.
Figure 2:
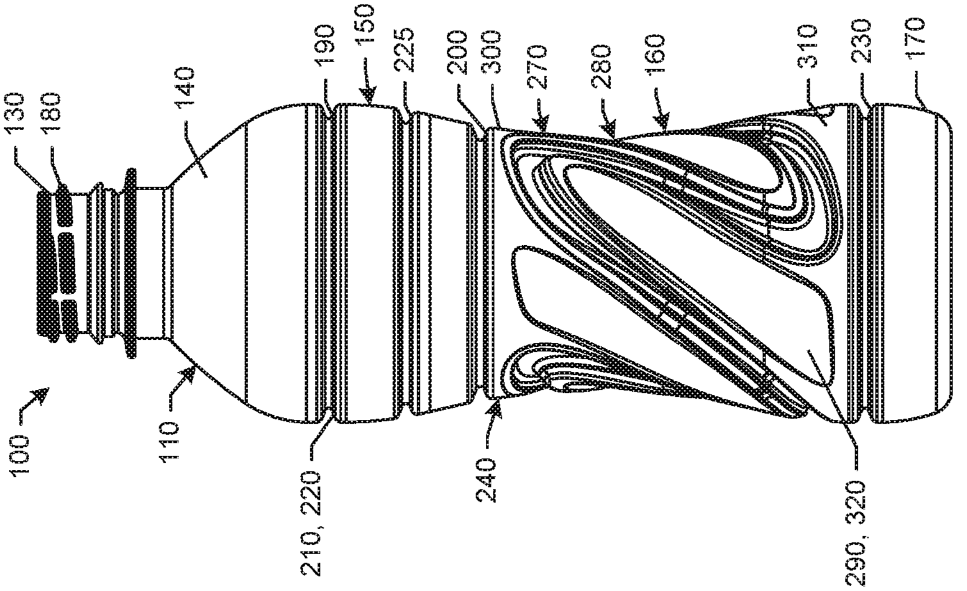
FIG. 2 is a front plan view of the hot fill container of FIG. 1.
Figure 4:
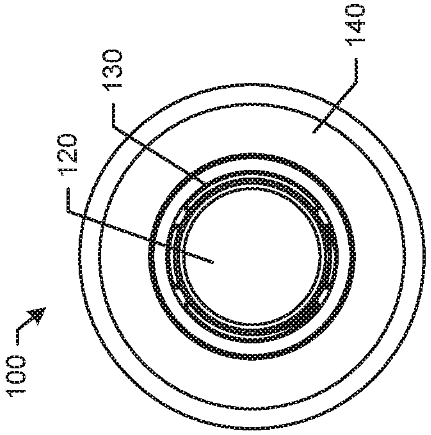
FIG. 4 is a top plan view of the hot fill container of FIG. 1.
Figure 5:
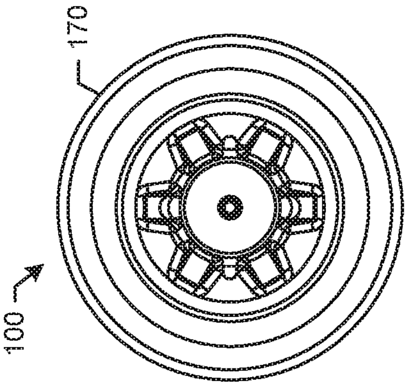
FIG. 5 is a bottom plan view of the hot fill container of FIG. 1.
Figure 3:
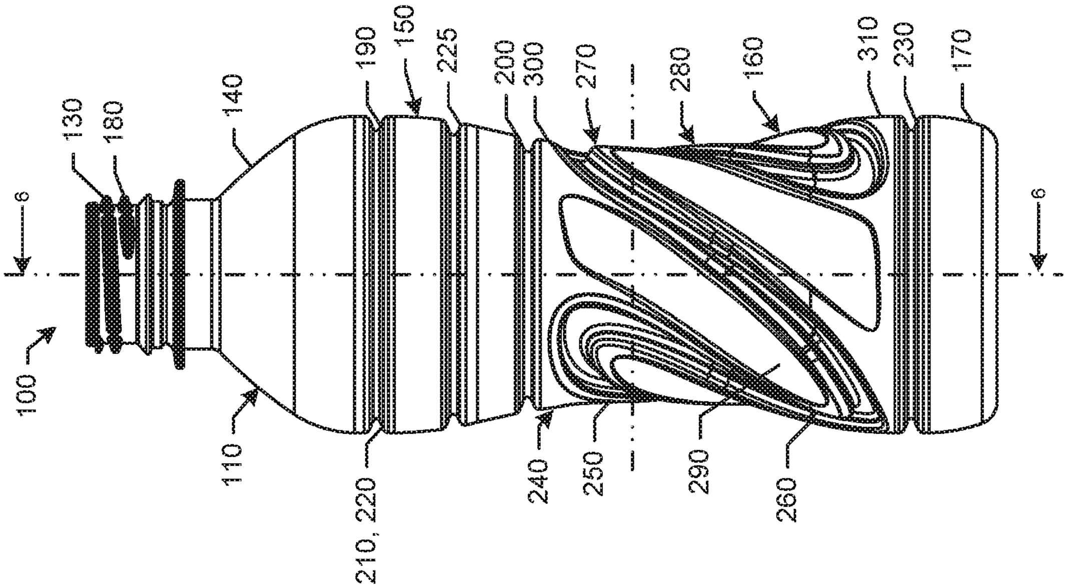
FIG. 3 is a side plan view of the hot fill container of FIG. 1
Figure 7:
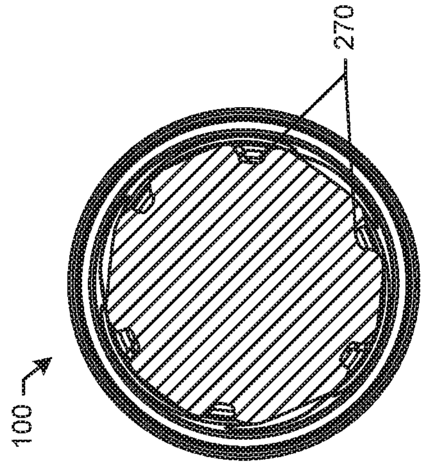
FIG. 7 is a sectional view of the hot fill container of FIG. 3 taken along line 7-7.
Figure 6:
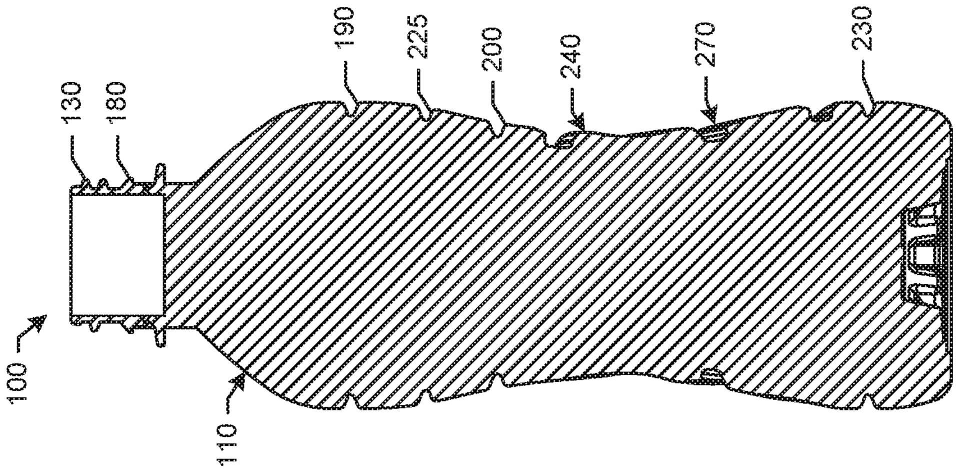
FIG. 6 is a sectional view of the hot fill container of FIG. 3 taken along line 6-6.

Referring now to the drawings in which like numerals refer to like elements throughout the several views, FIGS. 1-7 show a container 100 as may be described herein. The container 100 may be in the shape of a bottle 110 and the like. The bottle 110 may have any suitable size, shape, or configuration. The bottle 110 may be made from an injection molded preform. The preform may be made from various types of polymer resins. These polymer resins may include polyesters, polyolefins, polypropylene, polycarbonates, nitrates, and copolymers thereof. Biaxially oriented polyethylene terephthalate ("PET") may be commonly used. Other materials such as polylactide acid ("PLA") and the like also may be used herein. The polymers may be clear or opaque. Other types of materials may be used herein.

Generally described, the bottle 110 may include an open mouth 120, a finish 130, a shoulder 140, an upper section 150, a lower section 160, and a base 170 in any desired size, shape, or configuration. The open mouth 120 and the finish 130 may be largely of conventional design. The finish 130 may have one or more threads 180 thereon. The finish 130 and the threads 180 may be sized to accommodate a closure (not shown) thereon. The closure may be largely of conventional design. The shoulder 140 may be largely dome like in shape and may expand in diameter from the finish 130 downward to the upper section 150. The size, shape, and configuration of the shoulder 140 may vary.

The upper section 150 may extend from the shoulder 140 to the lower section 160. The upper section 150 may be separated from the shoulder 140 by an upper circumferential groove 190. The upper section 150 may be separated from the lower section 160 by a middle circumferential groove 200. The grooves 190, 200 may be in the form of an indentation 210 within a sidewall 220 of the bottle 110. The size, shape, and configuration of the grooves 190, 200 and the indentations 210 may vary. The upper section 150 may have one or more upper section circumferential grooves 230 formed therein. Although only one upper section circumferential groove 225 is shown, any number may be used herein in any suitable size, shape, or configuration. The upper section 150 may have a slightly reduced diameter in the direction from the upper circumferential groove 190 to the middle circumferential groove 200. Other components and other configurations may be used herein.

The lower section 160 may extend from the upper section 150 to the base 170. The lower section 160 may be separated from the upper section 150 by the middle circumferential groove 200. The lower section 160 may be separated from the base 170 by a lower circumferential groove 230. The size, shape, and configuration of the lower circumferential groove 230 may vary. The lower section 160 may have a somewhat "hour glass" like configuration 240 with an upper area of decreasing diameter 250 and a lower area of increasing diameter 260. The nature of the hour glass like configuration 240 may vary.

The lower section 160 may have one or more wavy grooves 270 therein. The wavy groove 270 may extend in an angled configuration from the lower circumferential groove 230 to the middle circumferential groove 200 in a repeating fashion 205. Although three (3) repeats 205 are shown, any number may be used herein. In this example, one wavy groove 270 is shown in a continuous loop 280 around the entire lower section 160. Any number of the wavy grooves 270 may be used herein in continuous or non-continuation fashion. The wavy groove 270 also is an indentation 210 into the sidewall 220 of the bottle 110. The depth and width of the indentation 210 of the wavy groove 270 may vary.

Each of the repeats 205 of the wavy groove 270 may extend across the lower section 160 in a substantially "Z-like" shape 280. By the term "Z-like" shape 280, we mean that a vertical line along the length of the lower section 160, i.e., in the direction of a longitudinal axis of the bottle 110, would intercept the wavy groove 270 either once, twice, or three times. The wavy groove 270 and the substantially "Z-like" shape 280 may define a number of tongue panels 290 therebetween in the sidewall 220 of the bottle 110. Specifically, the "Z-like" shape 280 of the wavy groove 270 forms the panels 290 in the shape of a tongue therebetween. Given the use of a single, continuous wavy groove 270, the wavy groove 270 may bisect a first continuous tongue panel 300 and a second continuous tongue panel 310. Moreover, the tongue panels 290 may have a varied contoured shape 320 that may vary along the length thereof. The size, shape, and configuration of the wavy groove 270 and the tongue panels 290 may vary. Other components and other configurations may be used herein.

The base 170 may extend from the lower section 160. The base 170 may be separated from the lower section 160 by the lower circumferential groove 230. The base 170 may be of conventional design and may have any suitable size, shape, or configuration. The base 170 may be similar in design to those generally used in cold fill processes.

The bottle 110 herein may be intended for a beverage size of about 250 milliliters with the use of a standard 28 millimeter finish 130 and a standard base 170. The bottle 110 may have an overall height of about 167 millimeters or so. The bottle 110, and the features thereof, however, may be sized up or down as may be desired. At the 250 milliliter size, the bottle 110 may use about 15 grams or less of a PET material or other types of thermoplastics. The indentation 210 of the wavy groove 270 may extend about 3.3 to about 3.7 millimeters or so within the sidewall 220 of the bottle 110. The current example may be about 3.5 millimeters. The depth of the indentation 210 may vary.

In use, the bottle 110 may be filled in a conventional hot fill process and capped with a closure in a conventional capping station. As the beverage within the bottle 110 cools, the beverage will contract and begin to pull a vacuum therein. As opposed to a conventional hot fill container that may be designed to accommodate the vacuum by deforming about the base, the bottle 110 herein has improved rigidity given the use of the wavy groove 270 and the tongue panels 290 in the lower section 160. The wavy groove 270 and the tongue panels 290 allow limited bending and flexing so as to absorb the vacuum while maintaining the integrity and shape of the bottle 110. The use of the Z-like shape 280 also may allow a controlled amount of twisting to accommodate further the vacuum therein. If the total surface area under the neck ring is about 26,426 square millimeters and the surface area of the lower section 160 is about 11,461 square millimeters, than the overall ratio of the flexing lower section 160 to the bottle 110 as a whole may be about 43.3 percent. The reduction in diameter of the lower section 160 may be less than about 1.5% or so. Moreover, the upper section 150 provides a comfortable grip with improved hoop strength and improved top loading. A label or other type of wrapper may be affixed to the bottle 110 in whole or in part in a conventional manner.

Significantly, the use of the wavy groove 270, the Z-like shape 280, and the tongue panels 290 provides such rigidity with a reduced amount of material. Even at the 250 milliliter size, conventional hot fill bottles may require additional material, particularly if the bottle accommodates the vacuum through the base. The reduced amount of material thus provides a significant cost savings in a hot fill bottle. The bottle 110 herein thus may be ultra-light but with improved rigidity. Given the use of less than about 15 grams of material for a 250 milliliter bottle, the ratio of material to size thus may be about one (1) to seventeen (17) or less.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A container for a beverage filled in a hot fill process, the container comprising:
- a finish with threads;
- a dome below the finish;
- an upper section below the dome; and
- a lower section,
- the lower section comprising a wavy groove defining a plurality of tongue panels;
- wherein the wavy groove comprises a Z-like shape;
- wherein a vertical line along a length of the lower section intersects the wavy groove at least twice; and
- wherein the upper section and the lower section are separated by a middle circumferential groove.

2. The container of claim 1, wherein the dome is separated from the upper section by an upper circumferential groove.

3. The container of claim 1, wherein the upper section comprises an upper section circumferential groove therein.

4. The container of claim 1, further comprising a base, wherein the base is separated from the lower section by a lower circumferential groove.

5. The container of claim 1, wherein the lower section comprises a substantial hour glass configuration in the form of an upper decreasing diameter area and a lower increasing diameter area.

6. The container of claim 1, wherein the wavy groove comprises a continuous wavy groove extending around the lower section.

7. The container of claim 1, wherein the wavy groove comprises a plurality of repeats.

8. The container of claim 1, wherein the wavy groove bisects a first tongue panel and a second tongue panel.

9. The container of claim 1, wherein the plurality of tongue panels comprises a contoured shape.

10. The container of claim 1, wherein the container comprises a 250 milliliter bottle.

11. The container of claim 1, further comprising less than 15 grams of a thermoplastic.

12. The container of claim 1, wherein a ratio of material in terms of mass in grams to size in terms of volume in milliliters is one (1) to seventeen (17) or less.

13. The container of claim 1, wherein the lower section comprises forty percent (40%) or more of the container.

14. A method of filling a container with a hot liquid, the method comprising:

positioning a wavy groove and a plurality of tongue panels along a lower section of the container, wherein a vertical line along a length of the lower section of the container intersects the wavy groove three times;

filling the container with the hot liquid;

cooling the container;

forming a vacuum within the container; and flexing the container about the wavy groove and the plurality of tongue panels.

15. A container for a beverage filled in a hot fill process, the container comprising:

an upper section; and a lower section, the lower section comprising a wavy groove defining a plurality of tongue panels;

wherein the wavy groove comprises a Z-like shape; and wherein a vertical line along a length of the lower section intersects the wavy groove three times.

* * * * *